(12) United States Patent
Kise et al.

(10) Patent No.: US 11,313,732 B2
(45) Date of Patent: Apr. 26, 2022

(54) TI—NI-BASED ALLOY; WIRE, ELECTRICALLY CONDUCTIVE ACTUATOR, AND TEMPERATURE SENSOR, EACH USING THIS ALLOY; AND METHOD OF PRODUCING A TI—NI-BASED ALLOY

(71) Applicants: FURUKAWA TECHNO MATERIAL CO., LTD., Hiratsuka (JP); TOKYO INSTITUTE OF TECHNOLOGY, Tokyo (JP); FURUKAWA ELECTRIC CO., LTD., Tokyo (JP)

(72) Inventors: Sumio Kise, Hiratsuka (JP); Fumiyoshi Yamashita, Hiratsuka (JP); Misato Fujii, Hiratsuka (JP); Tomonari Inamura, Tokyo (JP); Hideki Hosoda, Tokyo (JP); Yuri Shinohara, Tokyo (JP); Masaki Tahara, Tokyo (JP); Ryota Morishige, Tokyo (JP); Keisuke Saito, Tokyo (JP)

(73) Assignees: FURUKAWA TECHNO MATERIAL CO., LTD., Hiratsuka (JP); TOKYO INSTITUTE OF TECHNOLOGY, Tokyo (JP); FURUKAWA ELECTRIC CO., LTD., Tokyo (JP)

(*) Notice: Subject to any disclaimer, the term of this patent is extended or adjusted under 35 U.S.C. 154(b) by 0 days.

(21) Appl. No.: 16/731,669

(22) Filed: Dec. 31, 2019

(65) Prior Publication Data
US 2020/0209068 A1 Jul. 2, 2020

Related U.S. Application Data

(63) Continuation of application No. PCT/JP2018/034368, filed on Sep. 18, 2018.

(30) Foreign Application Priority Data

Oct. 10, 2017 (JP) .............................. JP2017-197222

(51) Int. Cl.
*C22C 14/00* (2006.01)
*C22C 19/03* (2006.01)
(Continued)

(52) U.S. Cl.
CPC ................ *G01K 5/48* (2013.01); *B22D 11/06* (2013.01); *C22C 14/00* (2013.01); *C22C 19/03* (2013.01)

(58) Field of Classification Search
CPC ............................... C22C 14/00; C22C 19/03
(Continued)

(56) References Cited

U.S. PATENT DOCUMENTS 7,974,025 B2 * 7/2011 Topliss ..................... G03B 3/10
359/823

FOREIGN PATENT DOCUMENTS

JP 58-157934 A 9/1983
JP 1-162738 A 6/1989
(Continued)

OTHER PUBLICATIONS

Sitnikov et al., "Local structure of TiNiCu(Hf) shape memory alloys: XAFS data analysis", Nov. 2010, Zeitschrift Fuer Kristallographie, URL: <https://www.researchgate.net/publication/48261090_Local_structure_of_TiNiCuHf_shape_memory_alloys_XAFS_data_analysis>, pp. 478-481 (Year: 2010).*

(Continued)

*Primary Examiner* — Humera N. Sheikh
*Assistant Examiner* — Katherine A Christy
(74) *Attorney, Agent, or Firm* — Birch, Stewart, Kolasch & Birch, LLP

(57) ABSTRACT

A Ti—Ni-based alloy, which has a torsion angle for Interface I that is a junction plane between habit plane variants of a martensitic phase, of less than 1.00°; a wire, an electrically
(Continued)

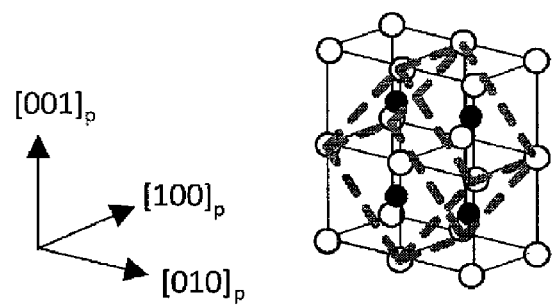

Parent phase B2 structure

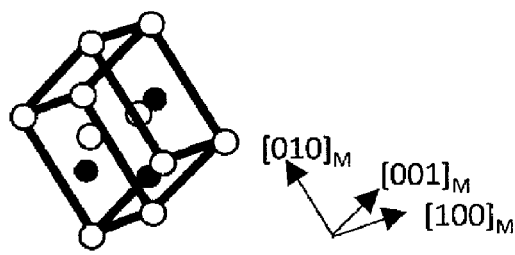

Martensite phase B19' structure conductive actuator, and a temperature sensor, each of which uses that alloy; and a method of producing the Ti—Ni-based alloy.

9 Claims, 6 Drawing Sheets

(51) Int. Cl.
  *G01K 5/48* (2006.01)
  *B22D 11/06* (2006.01)
(58) Field of Classification Search
  USPC .......................................................... 374/52
  See application file for complete search history.

(56) References Cited

FOREIGN PATENT DOCUMENTS

| JP | 3-150333 A | 6/1991 |
| JP | 4-41638 A | 2/1992 |
| JP | 5-195124 A | 8/1993 |
| JP | 6-172886 A | 6/1994 |
| JP | 8-60275 A | 3/1996 |
| JP | 8-337854 A | 12/1996 |
| JP | 10-36952 A | 2/1998 |
| JP | 2001-107164 A | 4/2001 |
| JP | 2009-127081 A | 6/2009 |

OTHER PUBLICATIONS

Korean Office Action for corresponding Korean Applicaton No. 10-2019-7027150, dated Jun. 28, 2021, with English translation.
Inamura et al., "Self-accommodation of B19' martensite in Ti—Ni shape memory alloys. Part III. Analysis of habit plane variant clusters by the geometrically nonlinear theory"., Philosophical Magazine, vol. 92, No. 17, pp. 2247 to 2263, Jun. 11, 2012.
International Search Report (PCT/ISA/210), issued in PCT/JP2018/034368, dated Dec. 11, 2018.
Song et al., "Enhanced reversibility and unusual microstructure of a phase-transforming material"., Nature, vol. 502, pp. 85 to 88, Oct. 3, 2013.
Chinese Office Action and Seach Report for counterpart Chinese Application No. 201880019318.0, dated Oct. 10, 2020, with English translation of the Office Action.
Chastaing et al., "Effect of Cu and Hf additions on NiTi martensitic transformation," Materials Science and Enginnering A, vol. 438-440, 2006, pp. 661-665.
Extended European Search Report for corresponding European Application No. 18865839.7, dated Feb. 10, 2021.
Kuranova et al., "Structural and Phase Transformations and Properties of TiNi—TiCu Quasi-Binary Alloys," Technical Physics Letters, vol. 42, No. 4, 2016, pp. 376-379.
Rani et al., "Effect of Cu on Structural and FF-Behavior of NiTi Shape Memory Alloy," Key Engineering Materials, vol. 442, 2010, pp. 301-308.
Rontó et al., "Characterization of the solidifying microstructure in Ti60(NixCu40-x)40 alloys," Materials Science Forum, vols. 790-791, May 9, 2014, pp. 491-496.
Chinese Office Action for Chinese Application No. 201880019318.0, dated Apr. 20, 2021, with English translation.
Chen et al., "Engineering Materials and Thermal Processing Technology," Northwest University Press, Feb. 2008, p. 164 (2 pages total).
Chinese Office Action and Search Report for corresponding Chinese Application No. 201880019318.0, dated Jul. 27, 2021, with English translation.
Korean Office Action for corresponding Korean Application No. 10-2019-7027150, dated Dec. 20, 2021, with English translation.

\* cited by examiner

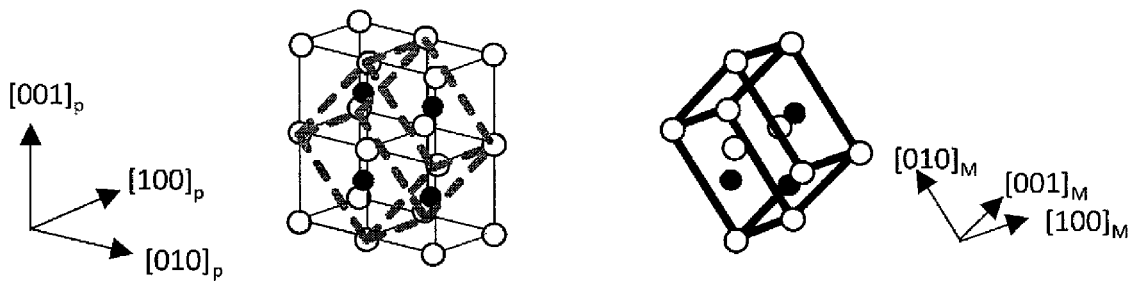
Parent phase B2 structure
Fig. 1(a)
Martensite phase B19' structure
Fig. 1(b)
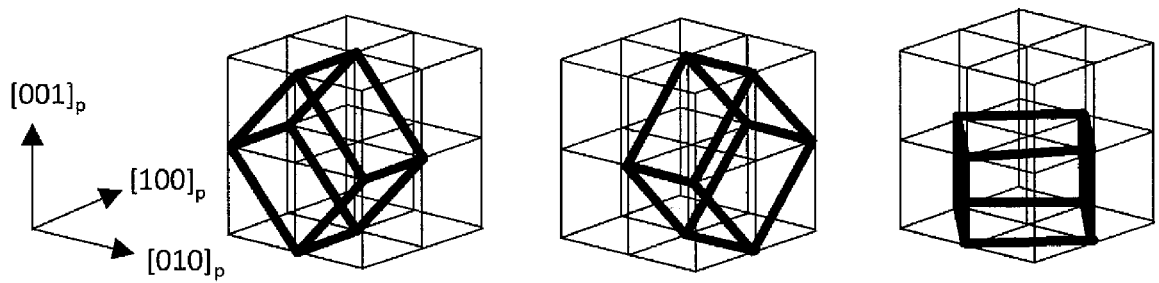
Fig. 1(c)  Fig. 1(d)  Fig. 1(e)
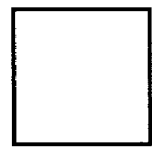
Parent phase
Fig. 2(a)
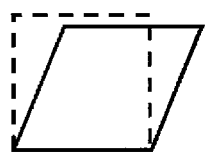
Phase transformation
Fig. 2(b)
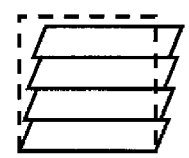
Slip deformation
Fig. 2(c)
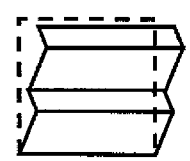
Twinning deformation
Fig. 2(d)

⊙ [111] | [101]$_{2',4',6'}$ —— KC & Twin (Interface I)  ········ LID trace
----- KC    ---- Twin-OR    ▬▬ Non-condition — KC & Twin (Interface I)
—·— KC (Interface II)
↻ Rotation around ~ [111]

······ LID trace
═══ Non-condition (Interface IV)
↻ Rotation around ~ [111]

TI—NI-BASED ALLOY; WIRE, ELECTRICALLY CONDUCTIVE ACTUATOR, AND TEMPERATURE SENSOR, EACH USING THIS ALLOY; AND METHOD OF PRODUCING A TI—NI-BASED ALLOY

CROSS-REFERENCE TO RELATED APPLICATIONS

This application is a Continuation of PCT International Application No. PCT/JP2018/034368 filed on Sep. 18, 2018, which claims priority under 35 U.S.C. § 119 (a) to Japanese Patent Application No. 2017-197222 filed in Japan on Oct. 10, 2017. Each of the above applications is hereby expressly incorporated by reference, in its entirety, into the present application.

TECHNICAL FIELD

The present invention relates to a Ti—Ni-based alloy; a wire (a wire rod), an electrically conductive actuator, and a temperature sensor, each using this alloy; and a method of producing a Ti—Ni-based alloy (alloy material).

BACKGROUND ART

Shape memory alloys and superelastic alloys exhibit a remarkable shape memory effect and superelastic characteristics, concomitant to the forward and reverse transformations of thermoelastic martensitic transformation, and have excellent functions near the living environment temperature. Thus, any of those shape memory alloys and superelastic alloys has been put to practical use in various fields. Among them, a representative material of shape memory alloys and superelastic alloys that have been put to practical use is a Ti—Ni-based alloy. Ti—Ni-based alloy-based shape memory alloys and superelastic alloys (hereinafter, these are collectively and simply referred to as Ti—Ni-based alloys) are superior to other shape memory alloys and superelastic alloys (alloy materials), in terms of durability in cyclic deformation, corrosion resistance, and the like. Thus, it can be said that practical use of these alloys has been made possible due to these excellent characteristics.

For this reason, investigations on Ti—Ni-based alloys have been actively conducted, and for example, a Ti—Ni—Hf-based alloy and a Ti—Ni—Zr-based alloy have been suggested as alloys that can be used at high temperatures (see Patent Literatures 1 and 2).

On the other hand, in recent years, there has been a demand for materials having higher durability in all fields, and there has also been a demand for further enhancement of characteristics in shape memory alloys and superelastic alloys. For example, research focused on enhancement of thermal cycle characteristics is also being conducted (see Non-Patent Literature 1). Above all, an enhancement of durability against cyclic heat-deformation is desirable; however, development of means for raising the base value in cyclic deformation of Ti—Ni-based shape memory alloys and superelastic alloys is still considered insufficient.

In Non-Patent Literature 2, results of detailed investigations are reported, with respect to: the crystal structures of the matrix (mother phase or parent phase) and the martensitic phase, such as the habit plane of Ti—Ni-based alloys, the junction plane of HPV, and the form of HPVC, and their consistency.

CITATION LIST

Patent Literatures

Patent Literature 1: JP-A-H05 (1993)-195124
Patent Literature 2: JP-A-2001-107164

Non-Patent Literatures

Non-Patent Literature 1: Nature Vol. 502, 85 to 88 (Oct. 3, 2013) Non-Patent Literature 2: Philosophical Magazine Vol. 92, No. 17, 2247 to 2263 (Jun. 11, 2012)

SUMMARY OF INVENTION

Technical Problem

The Ti—Ni—Hf-based alloy and the Ti—Ni—Zr-based alloy described in Patent Literatures 1 and 2 can be used at high temperatures. Patent Literatures 1 and 2 may be considered as inventions both assuming utilization of the respective alloy for temperature sensors or actuators. However, there is no description on the deterioration of the thermal cycle characteristics, and the evaluation of the transformation temperature by a differential scanning calorimetry (hereinafter, referred to as DSC) is performed by making measurement only once. Thus, it can be seen that the technique at that time did not reach a level of conceiving an enhancement in the thermal cycle characteristics. The alloys invented in Patent Literatures 1 and 2 are poor in thermal cycle characteristics, and the transformation temperature is significantly lowered after several thermal cycle tests.

In Non-Patent Literature 1, an Au—Cu—Zn-based alloy, which is a new alloy system, is found by paying attention to improvement of thermal cycle characteristics. This alloy system becomes an alloy system in which the consistency of various interfaces is perfectly balanced, as the cofactor condition is satisfied. Thus, excellent thermal cycle characteristics are obtained, and excellent thermal cycle characteristics are obtained. However, the Au—Cu—Zn-based alloy is an alloy system that cannot be easily put to practical use in all aspects, such as the raw material cost, processability, and use temperature.

Non-Patent Literature 2 discloses the results of an investigation conducted in detail by Inamura et al. of Tokyo Institute of Technology, who are the inventors of the present invention, on the crystal structures of the parent phase and the martensitic phase, such as the habit plane of a Ti—Ni-based alloy, the junction plane of HPV, and the form of HPVC, and the consistency of the crystal structures. In Non-Patent Literature 2, Interface I, which is an interface of 2-HPVC formed by two HPV's combined together, is the most basic interface, and Interface I is included in all clusters of 2-, 3-, 4-, and 6-HPVCs. Furthermore, according to this study, only in a case in which Q of rotation=I, a distortion-free condition can be achieved in both the habit plane and the junction plane, and in other cases, distortion occurs in either of the habit plane and the junction plane. Thus, it is contemplated that if it is possible to bring rotation Q close to I, accumulation of dislocations in transformation is suppressed, and if any change in the transformation temperature caused by repetition of transformation can be suppressed, the thermal cycle characteristics are improved. However, the control factors for Ti—Ni-based alloys are not clearly identified.

As such, various Ti—Ni-based alloys have been hitherto studied and investigated, and above all, it can be seen that in recent years, attention is focused on alloys having high thermal cycle characteristics. Conventional Ti—Ni-based shape memory alloys and superelastic alloys have a problem that when the alloys are repeatedly subjected to deformation, dislocations accumulate, and the transformation temperature is slowly lowered. Furthermore, in conventional technologies, no amelioration has been achieved against the deterioration of thermal cycle characteristics in repeated (cyclic) deformation. On the other hand, alloys that have been currently identified to have high thermal cycle characteristics are alloy systems that may not be easily put to practical use.

In view of such circumstances, according to the present invention, it is contemplated for providing a Ti—Ni-based alloy having excellent thermal cycle characteristics and high practical usability.

Furthermore, according to the present invention, it is also contemplated for providing a wire rod that uses the Ti—Ni-based alloy having excellent thermal cycle characteristics, an electrically conductive actuator, a temperature sensor, and a method of producing the Ti—Ni-based alloy material.

Solution to Problem

The inventors of the present invention having conducted a thorough investigation in order to solve the problems described above, and as a result, the inventors have found that, by controlling the rotation angle θ (hereinafter, referred to as torsion angle) of Interface I, which is a junction plane between HPV's of the Ti—Ni-based alloy, it can be reduced that the occurrence in which the transformation temperature is lowered in a thermal cycle test.

According to the present invention, it has been found that when a Ti—Ni-based alloy having a torsion angle for Interface I, which is a junction plane between habit plane variants of the martensitic phase, of less than 1.00° is produced, it can be obtained that the Ti—Ni-based alloy that provides excellent thermal cycle characteristics.

The tasks of the present invention described above are achieved by the following means.

(1) A Ti—Ni-based alloy, which has a torsion angle for Interface I that is a junction plane between habit plane variants of a martensitic phase, of less than 1.00°.

(2) The Ti—Ni-based alloy as described in the item (1), in which a crystal structure of the martensitic phase is composed of two or more phases.

(3) The Ti—Ni-based alloy as described in the item (1) or (2), in which the alloy comprises 25.0 to 35.0 atom % of Ni, 0.0 to 10.0 atom % of Hf, and 15.0 to 25.0 atom % of Cu, with the balance being Ti and unavoidable impurities.

(4) The Ti—Ni-based alloy as described in any one of the items (1) to (3), in which a transformation temperature after 10 cycles in a thermal cycle test is lowered by 1.0° C. or less.

(5) The Ti—Ni-based alloy as described in any one of the items (1) to (4), in which the Ti—Ni-based alloy is a Ti—Ni-based shape memory alloy or a Ti—Ni-based superelastic alloy.

(6) A wire (a wire rod), which is composed of the Ti—Ni-based alloy described in any one of the items (1) to (5).

(7) An electrically conductive actuator, which is comprised of the wire rod as described in the item (6).

(8) A temperature sensor, which is comprised of the wire rod as described in the item (6).

(9) A Ti—Ni-based alloy, comprising a martensitic phase having a crystal structure composed of two or more phases.

(10) A Ti—Ni-based alloy, in which the alloy comprises 25.0 to 35.0 atom % of Ni, 0.0 to 10.0 atom % of Hf, and 15.0 to 25.0 atom % of Cu, with the balance being Ti and unavoidable impurities.

(11) A method of producing a Ti—Ni-based alloy (alloy material), with the method comprising: a step of melting the Ti—Ni-based alloy as described in any one of the items (3) to (5), (9), and (10), and casting the thus-molten alloy at a cooling speed of 10° C./second or higher; and a step of homogenization treatment.

(12) A method of producing a Ti—Ni-based alloy, with the method comprising the following Steps (a) to (d):

Step (a) a step of melting the Ti—Ni-based alloy as described in any one of the items (3) to (5), (9), and (10), and casting the thus-molten alloy at a cooling speed of 10° C./second or higher; Step (b) a step of hot working the resultant alloy at a temperature higher than a recrystallization temperature;

Step (c) a step of performing intermediate annealing, and cold working at a cumulative working ratio of 15% or higher; and Step (d) a step of forming a desired shape, by imparting a shape memory effect, and imparting a shape memory effect at a temperature at which a desired shape memory effect is obtained when the resultant alloy is re-heated to a temperature higher than or equal to a reverse martensitic transformation finish temperature ($A_f$ temperature).

Herein, according to the present invention, a lowering in the transformation temperature in a thermal cycle test, refers to the variation value of the martensitic transformation starting temperature ($M_s$ temperature) after repeating ten times of heating and cooling, at a temperature higher than or equal to the reverse martensitic transformation finish temperature ($A_f$ temperature) and a temperature lower than or equal to the martensitic transformation finish temperature ($M_f$ temperature) by DSC, as shown in FIG. 4.

Effects of Invention

The Ti—Ni-based alloy of the present invention is highly practically useful and can be used in various use applications particularly in which a shape memory effect is required, due to the excellent thermal cycle characteristics of the alloy. Thus, for example, the Ti—Ni-based alloy is expected to be applicable to an electrically conductive actuator, a temperature sensor, a connector, and the like. Furthermore, the above-described effect provided by the Ti—Ni-based alloy of the present invention is also exhibited in superelastic characteristics.

The above and other features and advantages of this invention will be more clearly disclosed from the following description, with reference to the attached drawings as appropriate.

BRIEF DESCRIPTION OF THE DRAWINGS

FIGS. 1(a) to 1(e) each are a schematic diagram of the crystal structures and lattice correspondences of various phases of the Ti—Ni-based alloy.

FIGS. 2(a) to 2(d) each are a schematic diagram of supplemental deformations of the martensitic phase.

MODE FOR CARRYING OUT THE INVENTION

Figure 3:
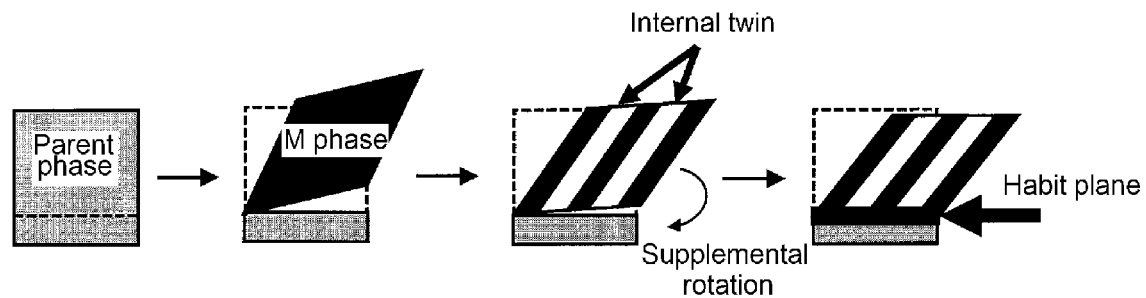
FIG. 3 is a schematic diagram of supplemental rotation of the martensitic phase.

When the Ti—Ni-based alloy of the present invention is defined in view of the metallographic structure of the alloy material, the torsion angle of Interface I, which is a junction plane between habit plane variants of the martensitic phase, is less than 1.00°.

When the Ti—Ni-based alloy of the present invention is defined in view of the composition constituting the alloy material, the alloy comprises 25.0 to 35.0 atom % of Ni, 0.0 to 10.0 atom % of Hf, and 15.0 to 25.0 atom % of Cu, with the balance being Ti and unavoidable impurities.

The Ti—Ni-based alloy of the present invention is capable of exhibiting the shape memory effect with satisfactory thermal cycle characteristics, only by being melted and cast at a cooling speed of 10° C./second or higher, and then being subjected to a homogenization treatment at, for example, a temperature of 800° C. or higher.

On the other hand, the Ti—Ni-based alloy of the present invention can be imparted with the shape memory effect or superelastic characteristics, by being melted and cast at a cooling speed of 10° C./second or higher, then being subjected to various hot-workings and cold-workings, or subjected to hot-workings or cold-workings, and then annealing or a heat treatment.

The present invention is the outcome of a study of repeating a structural analysis of the Ti—Ni-based alloy of the present invention on the basis of metallography. Thus, the outcome of the present invention cannot be explained, excluding a crystallographic theory.

Thus, the crystallographic theory for Ti—Ni-based alloys, including the studies conducted by Inamura et al., the inventors of the present invention, and research conducted thus far, will be described briefly.

<<Crystallographic Theory for Ti—Ni-Based Alloy and Research Conducted Thus Far>>

Through the studies conducted by Inamura et al., the inventors of the present invention, the inventors of the present invention have found that for an enhancement of durability of a Ti—Ni-based alloy, it is important that consistency of the junction plane between habit plane variants (hereinafter, referred to as HPV(s)) is achieved, while an interface between the parent phase and the martensitic phase is maintained as an invariable plane, by controlling the crystal structure of the alloy and controlling the lattice constants.

The crystallographic theory for Ti—Ni-based alloys and research conducted thus far will be described briefly below.

<Crystallographic Aspects of Martensitic Transformation>

Martensitic transformation is such that the atoms of the parent phase undergo displacement that is cooperative with deformation, and thus a new phase is formed. Thus, positional regularity of the atoms is maintained before and after the transformation, and the parent phase and the martensitic phase are in a one-to-one correspondence relationship in terms of the crystal lattice. This is referred to as lattice correspondence. The lattice correspondences of the Ti—Ni-based alloy, which is a representative shape memory alloy, are shown in FIGS. 1(a) to 1(e). A Ti—Ni-based alloy adopts the B2 structure, as shown in partial diagram FIG. 1(a), in the parent phase at high temperature, and adopts the B19' (monoclinic crystal) structure, as shown in partial diagram FIG. 1(b), in the martensitic phase at low temperature. For example, as shown in partial diagrams FIGS. 1(c) to 1(e), there are a plural number of methods for taking the principal axis azimuths of the martensitic phase, and there are obtained eventually twelve kinds of martensitic variants (hereinafter, referred to as variants) having different azimuths. Each of these is referred to as lattice correspondence variant (hereinafter, referred to as CV). Since the parent phase has a cubic structure, $[100]_P$, $[010]_P$, and $[001]_P$ of the parent phase are equivalent azimuths, and it is generated a plurality of methods for taking the principal axis azimuths of a martensitic phase that is in a lattice correspondence relationship with the parent phase. That is, a variant is a martensitic crystal having a different lattice correspondence with the parent phase but has the same crystal structure.

When a variation is induced from the state of the parent phase by applying stress, martensitic transformation occurs; however, at the time of this martensitic transformation, there is a large change in the shape. Thus, a large strain occurs at the interface between the parent phase and the martensitic phase. This strain at the interface is resolved by supplemental deformation and supplemental rotation of the martensite. A schematic diagram of supplemental deformation is shown in FIG. 2; however, such a supplemental deformation is generally a slip deformation, a lamination defect, or a twinning deformation, and such a deformation is referred to as lattice invariant deformation. Lattice invariant deformation is in many cases a deformation induced by twin crystals, and the twin crystals to be introduced at this time are referred to as internal twins. Furthermore, martensitic crystals cause rigid rotation (supplemental rotation), as shown in FIG. 3, and the interface between the parent phase and the martensitic phase (M phase) is brought into a non-strain non-rotation state. The parent phase-martensitic phase interface is referred to as habit plane, and the condition in which this habit plane is subjected to a non-strain non-rotation state is referred to as invariant plane (hereinafter, referred to as IP) condition. A variant that satisfies the IP condition at the habit plane is referred to as HPV.

<Crystallographic Theory>

In understanding of the junction state of a habit plane produced by martensitic transformation as described above, the phenomenological theory of martensitic crystallography (hereinafter, referred to as PTMC) is widely known as a theory for calculating the crystallographic parameters of the interface. PTMC is a theory based on the IP condition at a habit plane as a starting point, and when three parameters of: (1) the lattice constants of the parent phase and the martensitic phase; (2) the lattice correspondences of the parent phase and the martensitic phase; and (3) the lattice invariant deformation, are input, there can be calculated the habit plane orientation, the deformation gradient, and the like.

PTMC is useful for determining the habit plane orientation or the whole shape change of HPV; however, the junction interfaces of individual HPVs have not been taken into consideration. When a general polycrystalline material is to be handled, it is necessary to perform an analysis of a junction interface between HPV's, while considering that a self-regulating (self-accommodation) structure in the alloy is composed of a combination of a large number of HPV's. According to the studies made heretofore, a kinematic compatibility condition (hereinafter, referred to as KC condition) has been proposed as a condition in which a junction interface between HPV's is in a strain-free state. The KC condition is a condition for maintaining continuity as an object between two regions, in a case in which two adjacent regions are subjected to different deformations. In a case in which the deformations received from the respective regions are designated as F and G, the KC condition can be expressed by the following Formula (1):

$$QF - G = a \otimes \hat{n} \quad (1)$$

Q: Rotation matrix related to F. a: direction of deformation, n̂: normal line vector interface between two regions, Only in a case in which them are Q, a, and n̂ that satisfy (1), the two regions maintain continuity as an object.

By using the KC condition, the three junction interfaces can be accurately evaluated, namely, the junction interface between CV's in a HPV, the junction interface between the HPV and the parent phase, and the junction interface between HPV's. Various evaluations of a self-regulating structure using the KC condition have been achieved by conventional studies, in which the junction planes between HPV's in bcc-bct transformation, cubic-tetragonal transformation, and cubic-orthorhombic transformation in other alloy systems, with using the KC condition.

<Research so Far on Self-Regulating Structure>

The self-regulating structure of the martensitic phase is formed by a plurality of HPV's combined together so as to mitigate any macro change in shape. The smallest unit of the self-regulating structure formed at this time is referred to as HPV cluster (hereinafter, referred to as HPVC). For Ti—Ni-based alloys, four types of HPVC have been identified, and since they have two, three, four, and six HPV's, respectively, they are referred to as 2-, 3-, 4-, and 6-HPVC. Inamura et al. and Nishida et al. showed that the preferential form of HPVC is explained by the magnitude of rigid rotation Q at a junction plane between HPV's, which is evaluated on the basis of the KC condition. When HPV's that satisfy the IP condition at a habit plane are bonded, if the HPV's are rotated in order to make the junction plane distortion-free, the IP condition cannot be satisfied at the habit plane, and distortion occurs. That is, a distortion-free condition can be achieved at both the habit plane and the junction plane only in a case in which the rotation Q induced by the KC condition is unit matrix I, and it is considered that in other cases, distortion occurs at either one of them. Since the magnitude of distortion is smaller as the rotation Q is smaller, it is thought that small clusters of the rotation Q are preferentially formed. Furthermore, in Non-Patent Literature 2, Inamura et al. disclose the presence of deviation J from the twin crystal orientation relationship at the junction plane between HPV's, in addition to rigid rotation Q, and disclose that the preferential form of HPVC can be explained using Q and J.

Figure 7:
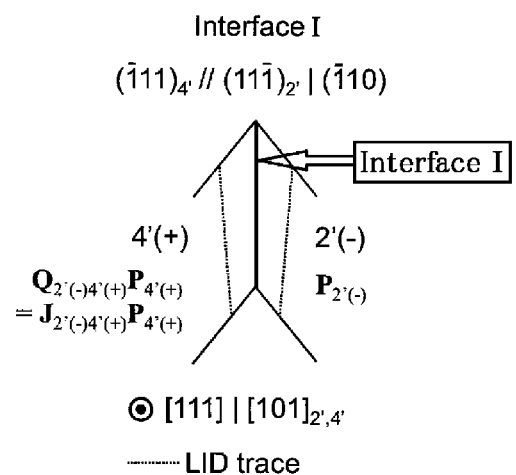
FIG. 7 is a diagram showing Interface I, which is an interface between clusters in 2-HPV clusters. 2-HPV cluster {i, j}={2'(−), 4'(+)} which forms interface I with the (11-1)2' type I twin.
Figure 8A:
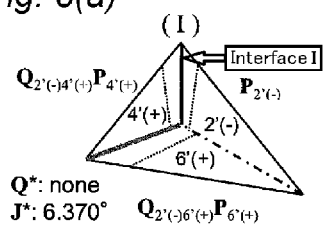
FIGS. 8(a) to 8(f) each are a diagram showing Interface I, which is an interface between clusters in 3-HPV clusters. Possible types of 3-HPV clusters (a) 6'(+) satisfies the KC condition with 2'(+), (b) 6'(+) maintains the $(-111)_2$' type I twin with 2'(−), (c) 6'(+) maintains the $(11-1)_4$' type I twin with 4'(+), (d) 6'(−) maintains the $(-111)_2$, type I twin with 2'(−), (e) 6'(−) satisfies the KC condition with 4'(+) and (f) 6'(−) maintains the $(11-1)_{4'}$ type I twin with 4'(+). The cluster in (d), which was observed with TEM, is presented in Parts I and II.
Figure 8B:
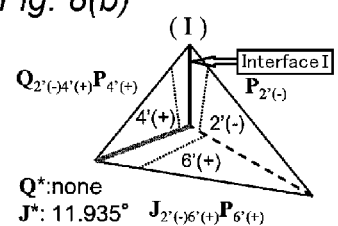
Figure 8C:
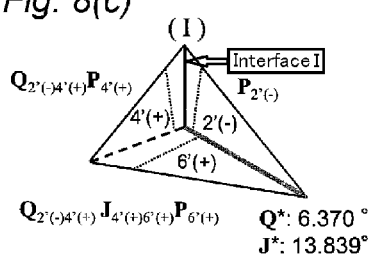
Figure 8D:
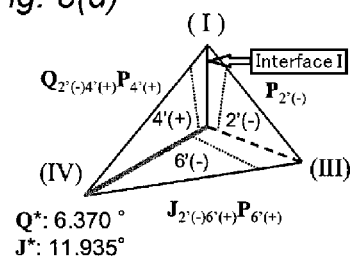
Figure 8E:
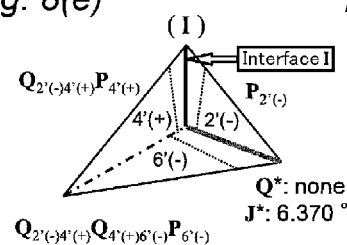
Figure 8F:
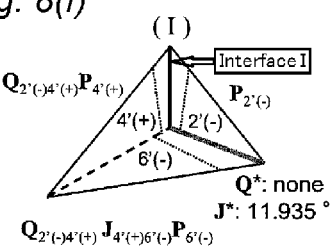

The junction interface between HPV's of HPVC in the self-regulating structure of a Ti—Ni-based alloy can be classified into four types from the rotation Q of HPV at the interface, twin crystal deviation J, and the twin crystal relationship. The minimum unit that forms a cluster is 2-HPVC formed by two HPV's combined together, and as shown in FIG. 7, the interface thereof is designated as Interface I. As shown in FIGS. 7 to 9(b), Interface I becomes the most basic interface and is included in all clusters of 2-, 3-, 4-, and 6-HPVC.

<Functional Deterioration and Self-Regulating Structure>

Shape memory alloys and superelastic alloys have been applied as temperature sensors or actuators from a shape memory effect produced at a particular temperature, and as medical instruments from superelastic characteristics showing a self-restoration function. However, it is known that when Ti—Ni-based alloys, which are representative shape memory alloys, are repeatedly used, the temperature at which transformation occurs from the parent phase to the martensitic phase (hereinafter, referred to as martensitic transformation temperature), undergoes changes. This is because dislocations are accumulated in the structure as a result of transformation. In the past studies on Ti—Ni-based alloys, it has been found that in a thermal cycle test that causes cyclic (repeated) deformation by means of temperature change, as the number of cycles increases, the transformation temperature is lowered, and dislocations are accumulated in the structure. With regard to the causative factor for the accumulation of dislocations caused by this transformation, the inventors of the present invention have considered that such accumulation is attributed to the fact that strain relaxation of HPVC in the self-regulating structure is not perfect. Herein, a distortion-free condition can be achieved at both the habit plane and the junction plane only in a case in which rotation Q=I, and in other cases, distortion occurs at either the habit plane or the junction plane. From this, it is considered that as long as rotation Q can be made closer to I, accumulation of dislocations in transformation is suppressed, and any change in the transformation temperature caused by repeating transformation can be suppressed.

<<Ti—Ni-Based Alloy>>

The Ti—Ni-based alloy of the present invention will be described in detail in view of the composition of the alloy material and the metal structure of the alloy material in this order.

<Composition of Ti—Ni-Based Alloy Material>

The Ti—Ni-based alloy of the present invention having a shape memory effect and/or superelastic characteristics is an alloy containing Hf and Cu at particular contents.

The Ti—Ni—Hf—Cu-based alloy material of the present invention has a composition including 25.0 to 35.0 atom % of Ni, 0.0 to 10.0 atom % of Hf, and 15.0 to 25.0 atom % of Cu, with the balance being Ti and unavoidable impurities.

When the content of Ni element is too small, the shape memory effect cannot be obtained at all. On the other hand, when the content of Ni is too large, the resultant alloy material becomes brittle. The content of Ni element varies according to the contents of Hf and Cu elements; however, a preferred content of Ni element is 30.0 to 35.0 atom %. When the amount of addition of Hf is too large, satisfactory thermal cycle characteristics cannot be obtained. The content of Hf element varies according to the contents of Ni and Cu elements; however, a preferred content of Hf is 0.0 to 10.0 atom %, and more preferably 0.0 to 5.0 atom %. The amount of addition of Cu is such that when the content is too small, satisfactory thermal cycle characteristics cannot be obtained, and when the content of Cu is too large, satisfactory processability cannot be obtained. The content of Cu element varies according to the contents of Ni and Hf elements; however, a preferred content of Cu is 15.0 to 25.0 atom %, and more preferably 15.0 to 20.0 atom %. The content of Ti varies according to the content of other elements; however, a preferred content of Ti is 40.0 to 50.0 atom %.

Furthermore, the unavoidable impurities included in the Ti—Ni-based alloy of the present invention are defined as impurities that are incorporated elements originating from the raw materials, elements that are unavoidably incorporated in the production process, and the like, which are originally unnecessary elements but are present in trace amounts, and which are allowable because the elements do not affect the characteristics of the Ti—Ni-based alloy. The content of each unavoidable impurity is preferably 0.1 atom % or less.

The Ti—Ni—Hf—Cu-based alloy material having the above-described composition has hot workability and cold workability, and can be worked by cold working at a working ratio of 15% or higher. Thus, the alloy material can be formed into a rod (wire), a plate (strip), an extra fine wire, a pipe, and the like. Furthermore, since a shape memory effect or thermal cycle characteristics equivalent to those of processed materials can be exhibited only when the alloy material is subjected to a homogenization heat treatment, after being melted and cast at a cooling speed of 10° C./seconds or higher. The alloy material can cope with shapes other than the above-described shapes.

<Metal Structure of Ti—Ni-Based Alloy Material>

The Ti—Ni-based alloy material of the present invention has a recrystallized structure. Furthermore, the Ti—Ni-based alloy material of the present invention is such that when the temperature changes toward the lower temperature side or the shape changes, the martensitic phase is induced; however, the crystal structure is mainly a structure of the B19' phase, the B19 phase, or the like. The crystal structure of the martensitic phase of the alloy material of the present invention is a single phase of the B19' phase or the B19 phase, or is in a mixed phase (two or more phases) state in which the B19' phase or the B19 phase co-exists simultaneously with another phase.

There are also occasions in which even in the case of one phase, the rotation angle of Interface I that will be described below is small, and the characteristics are sufficient, due to the principal structure of the martensitic phase. However, when the structure of the martensitic phase is a structure of two or more phases, since distortion in the structure as a whole is mitigated as the martensitic phase, in which local distortion can be mitigated most easily, is selectively formed, an alloy system having favorable thermal cycle properties is easily obtained.

Thus, the structure of the martensitic phase of the alloy material of the present invention may be composed of a single phase; however, a more preferred structure of the martensitic phase is composed of two or more phases.

<Definition of Interface I>

Interface I is one of the junction planes between HPV's, which are variants of martensite. It is clear from Non-Patent Literature 2 that Interface I, which is the interface of 2-HPVC formed by two HPV's combined together, becomes the most basic interface and is included in all clusters of 2-, 3-, 4-, and 6-HPVC. Since this Interface I is an interface present in all HPVC's of a Ti—Ni-based alloy, it is considered that Interface I has the largest influence on the structural form or the transformation temperature change.

<Definition of Rotation Angle θ of Interface I and Method of Determination Thereof>

Before the method of determining the rotation angle θ of interface I, which is the torsion angle, is explained, a method of analyzing rotation Q will be explained.

The shape change of HPV or the crystallographic parameters, such as rotation Q, has been analyzed by solving the formula for the KC condition using the method described in Microstructure of Martensite, Oxford University Press (2003).

The analysis has been carried out by three procedures, namely, (i) an analysis of the junction plane of internal twins $CV_i$ and $CV_j$ in a HPV; (ii) an analysis of the habit planes of the HPV and the parent phase; and (iii) an analysis of the junction plane between HPV's of $HPV_{\{i,j\}}$ and $HPV_{\{k,l\}}$. Herein, i, j, k, and l are positive integers representing the type of CV, and a HPV formed by $CV_i$ and $CV_j$ is described as $HPV_{\{i,j\}}$.

(i) is interpreted such that the following Formula (2) having $U_i$ and $U_j$ substituted therein is used for the deformation gradient of each CV of the formula for the KC condition.

$$Q''U_j - U_i = a \otimes \hat{n} \quad (2)$$

Q'': rotation necessary for making the bonding face between CV's distortion-free, a: direction of deformation, $\hat{n}$ normal line vector of bonding face Using the shape change of the HPV, the volume fractions of various CV's, and rotation Q'' of a CV obtainable from the above-described formula, the following Formula (3) is obtained.

$$\lambda Q''U_j + (1-\lambda)U_i \quad (3)$$

λ: volume fraction of $U_j$, (1–λ): volume fraction of $U_i$

Generally, $CV_i$ has a larger volume fraction than $CV_j$, and λ becomes ½ or less.

An analysis of (ii) is carried out using the following Formula (4) obtained by substituting the shape change formula for HPV described in (i) and the unit matrix I into the formula for the KC condition.

$$Q'(\lambda Q''U_j + (1-\lambda)U_i) - I = b \otimes \hat{m} \quad (4)$$

Q': rotation for satisfying the IP condition at a habit plane, b: direction of deformation, $\hat{m}$: normal line vector of the habit plane Herein, the unit matrix represents that the parent phase is not deformed.

Herein, the shape change of HPV including rotation Q' is designated as whole shape change $U_{\{i,j\}}$ of HPV and is represented by the following Formula (5).

$$U_{\{i,j\}} = Q'(\lambda Q''U_j + (1-\lambda)U_i) \quad (5)$$

An analysis of (iii) is carried out using the whole shape change $U_{\{i,j\}}$ of HPV. In the case of forming a cluster by junction two HPV's having the whole shape change $U_{\{i,j\}}$ and $U_{\{k,l\}}$, the junction plane is analyzed by the following Formula (6).

$$QU_{\{k,l\}} - U_{\{i,j\}} = a' \otimes \hat{n}' \quad (6)$$

Q is a rotation for satisfying the KC condition at a junction plane between HPV's, and in the present invention, in order to make the evaluation in a more quantitative manner, the rotation angle θ of the rotation is handled as an indicator for the difference from a distortion-free state.

When the torsion angle θ of the junction plane of the Interface I is made small, even if transformation of the parent phase and the martensitic phase is repeated, deterioration of the characteristics is reduced. It is considered that consequently the thermal cycle properties are enhanced, and thus, the lattice constant of the alloy system is controlled by addition of elements.

Herein, from the above-described point of view, the details of a technology will be explained, by which control of the torsion angle θ is enabled in fact.

The present alloy system has a crystal structure of the martensitic phase that varies depending on the composition; however, the structure is mainly composed of the B19' phase or the B19 phase. Thus, for example, it will be described on a calculation method for control the B19' phase.

Through a detailed investigation of the inventors of the present invention, it has become clear that when the lattice constants of the parent phase and the martensitic phase satisfy the following Formula (7), the torsion angle θ represents 0°.

$$\beta_{B19'} = 92.2 + 345(0.2889 - a_{B19'}) + 122.5(0.412 - b_{B19'}) + 78.33(0.468 - c_{B19'}) + 630(0.3015 - a_{B2}) \quad (7)$$

$a_{B19'}$, $b_{B19'}$, $c_{B19'}$: lattice constants of the respective axes of the martensitic phase,
$a_{B2}$: lattice constant of the parent phase,
$\beta_{B19'}$: angle between the a-axis and the c-axis of the martensitic phase From Formula (7) described above, it can be seen that the lattice constant that exerts the greatest influence on the torsion angle θ is $a_{B2}$. For the calculation, the following lattice constants are used, on Ti-50.25 Ni atom %, which is an alloy system of the conventional technology.

$$a_{B2} = 0.3015 \text{ nm}, a_{B19'} = 0.2889 \text{ nm}, b_{B19'} = 0.4120 \text{ nm}, c_{B19'} = 0.4622 \text{ nm}, \beta_{B19'} = 96.8°$$

In order to obtain a small torsion angle θ, it can be seen from the above-described formula and the lattice constants of the Ti-50.25 Ni atom %, that it is necessary to increase $a_{B2}$. However, for example, when Hf is added, $a_{B2}$ can be increased; however, at the same time, $\beta_{B19'}$ is also significantly increased. When $\beta_{B19'}$ increases by 1°, the absolute value of the torsion angle θ increases by 0.47°; thus, in the case of adding Hf, it is necessary to suppress the increase in $\beta_{B19'}$. On the other hand, it is found by the investigation of the present study that $\beta_{B19'}$ can be decreased by adding Cu, Pd, or Au.

As such, it is contemplated in the present invention for adjusting the amounts of addition of atoms so that while $a_{B2}$ is increased, other lattice constants are not increased, and the angle of $\beta_{B19'}$ can be decreased, and to produce and evaluate an alloy having a small torsion angle θ.

Furthermore, also in the case of another martensitic structure, adjustment similar to the above description is carried out; however, for example, in the case of the B19 phase, since the crystal structure is different, the relationship of the lattice constants of the parent phase and the martensitic phase is different from the above-described formula. However, in the case of the B19 phase, since it is fixed such that $\beta_{B19} = 90°$, it is possible to make the torsion angle θ small, by controlling the values of the lattice constants $a_{B2}$, $a_{B19}$, $b_{B19}$, and $c_{B19}$.

The value of the torsion angle θ is calculated, with using the calculation formula described above. Meanwhile, the calculation method for a case in which the structure of the martensitic phase is composed of one phase is as described above; however, for example, in the case of Example 1, the number of martensitic phases is two phases. In such a case, a principal crystal structure is selected, and the result thus determined is defined as torsion angle θ. For example, the crystal structure of Example 1 is identified as B19' phase+Cm structure, and since the B19' phase becomes the principal crystal structure, the torsion angle θ is determined, with using the measured lattice constants of the B19' phase. Since the structure of a martensitic phase composed of two or more phases as identified in the present invention is a crystal structure in which the B19' phase is basically the principal phase, the torsion angle θ is determined, with using the measured lattice constants of the B19' phase. However, in Example 7 or 14, the crystal structure of the two phases is, unlike other Examples, the B19 phase+B19' phase. Thus, the torsion angle θ is determined, with using the lattice constants of the B19 phase.

It is possible to find such control because the inventors of the present invention have performed an analysis of the crystal structures related to various alloy systems and thoroughly investigated the correlations thereof. Thus, it is not easy to find such control from the development of one certain alloy system.

The identification of the form of the martensitic phase (the number of phases), and phase identification and lattice constant measurement required for the determination of the value of torsion angle θ can be confirmed by X-ray diffraction (hereinafter, referred to as XRD) measurement. A method of producing a measurement sample and the measurement conditions will be described below.

A sample material is sliced into a sheet having a thickness of about 1 mm and is subjected to an etching treatment using a mixed solution of $HF:HNO_3:H_2O=1:4:5$ (vol %), and then a mirror face is produced by wet polishing using #4000 Emery paper and buff polishing using a diamond paste. Electrolytic polishing is performed using a mixed solution having a composition of $HNO_3:CH_3OH=1:3$ (vol %) under the conditions of a static current of 0.4 A and a temperature of 60° C. to 50° C. For the measurement, an X'pert Pro Galaxy system, manufactured by Philips N.V., is used, CuKα is used as the X-ray source, with being employed a tube voltage of 45 kV, a tube current of 40 mA, and a measurement range of 15° to 120°. The lattice constants are calculated by CELLCALC, using diffraction peaks obtained from XRD measurement.

Figure 4:
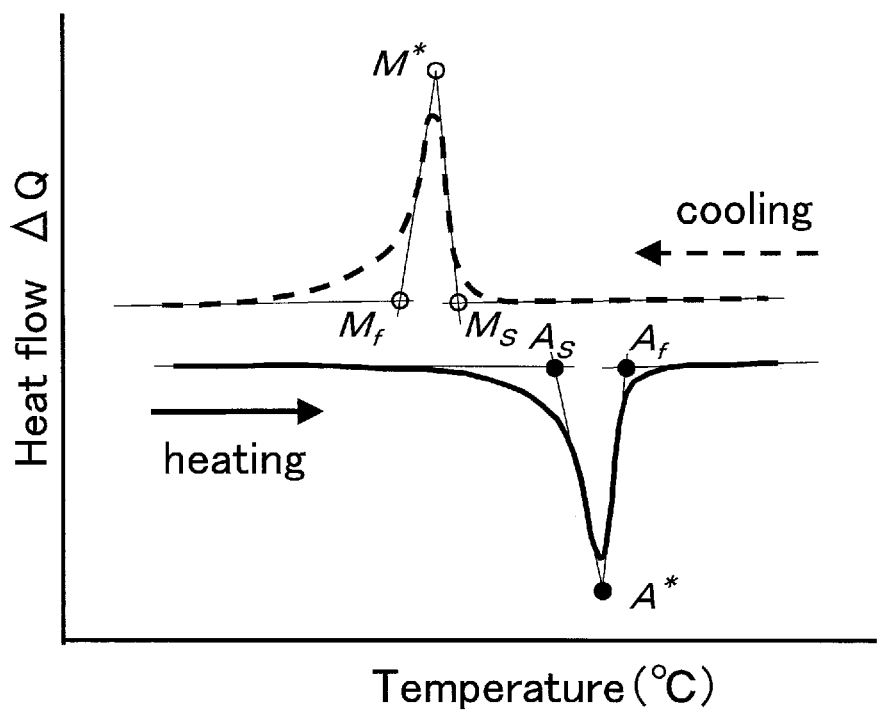
FIG. 4 is a schematic diagram of a chart showing the results of DSC.
Figure 5:
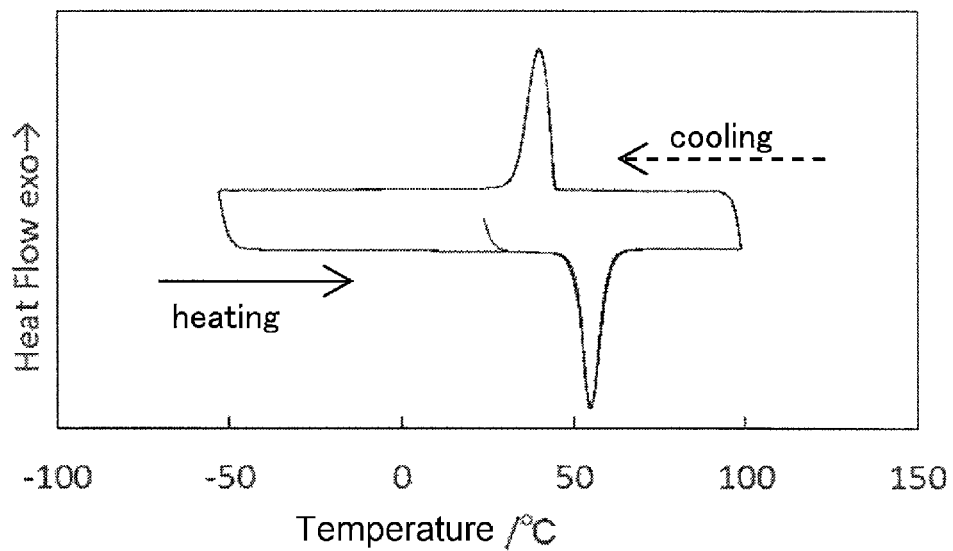
FIG. 5 is a chart showing the results of DSC for evaluating the thermal cycle characteristics in Example 2.

Herein, the Interface I and the torsion angle θ of the Interface I are shown in FIGS. 7 to 9(b), with using FIGS. 3 to 5 described in Non-Patent Literature 2 (Philosophical Magazine Vol. 92, No. 17, 2247-2263 (11 Jun. 2012)) by Inamura et al., who are the inventors of the present invention.

Figure 9A:
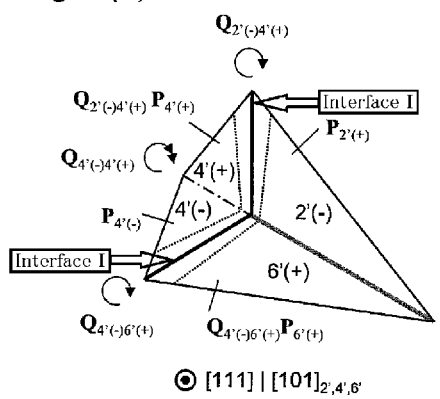
FIGS. 9(a) and 9(b) each are a diagram showing Interface I, which is an interface between clusters in 4-HPV clusters and 6-HPV clusters, and torsion angles θ thereof. Cancellation of Qij in (a) 4-HPV and (b) 6-HPV clusters. Note that 4'(+) can form interface I with 2'(−) and interface II with 4'(−) simultaneously since Q2'(−)4'(+) and Q4'(−)4'(+) are similar rotations. For the same reason, all JPs in 6-HPV clusters satisfy exactly or almost exactly the KC condition, and three out of six HPVs can satisfy the IP condition.
Figure 9B:
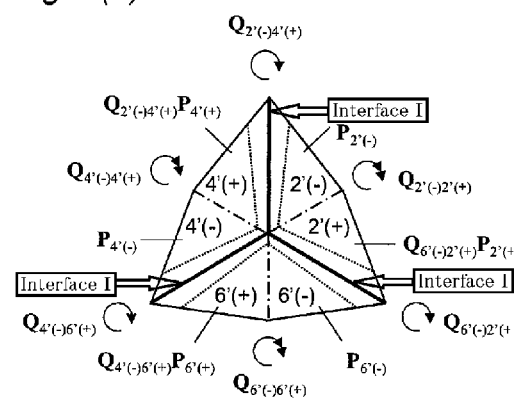

Herein, FIG. 7 shows 2-HPV clusters, FIGS. 8(a) to 8(f) each show 3-HPV clusters, and FIGS. 9(a) and 9(b) each show 4-HPV clusters and 6-HPV clusters.

In FIGS. 7 to 9(b), a solid line of the portion represented by an arrow is Interface I, which is the interface between two clusters, and the torsion angle θ of the Interface I is shown in FIGS. 9(a) and 9(b) as a representative among the diagrams.

In FIGS. 9(a) and 9(b), "Rotation around ~[111]" is the torsion angle θ. In this, the torsion angle θ of the Interface I is a rotating arrow represented by $Q_{4'(-)6'(+)}$, $Q_{2'(-)4'(+)}$, or $Q_{6'(-)2'(+)}$ in the Interface I of the portion represented by an arrow.

<Definition of Thermal Cycle Characteristics and Method of Measurement Thereof>

The Ti—Ni-based alloy of the present invention is excellent in thermal cycle characteristics.

Specifically, the changes in the martensitic transformation temperature and the reverse martensitic transformation temperature, each of which is caused by thermal cycles, are small.

Herein, a method of confirming the transformation temperature found from DSC will be described on the basis of a schematic chart of DSC in FIG. 4.

First, the principle of measurement of DSC will be described.

DSC is a method of changing the temperature of a sample at a constant speed, compensating the temperature change caused by a reaction in the sample in heating or cooling, with using a heater, and thereby measuring the amount corresponding to the specific heat of the sample. More accurately, when an alloy data and a standard substance are measured together, the absolute value of the specific heat is determined with accuracy to a certain extent. Since the specific heat corresponds to the differential of the quantity of transformation, when the area of peaks caused by transformation in the DSC chart is calculated, the quantities of transformation at various temperatures are determined, and the transformation temperature can be determined from the relationship between the quantity of transformation and temperature.

However, since the above-described method takes a lot of times, for practical use, a simplistic method is frequently used, which is shown in a schematic chart such as in FIG. 4.

First, a baseline is drawn, assuming a curve in a case in which there is no peak for the transformation temperature. Next, a straight line coinciding with a portion having the steepest gradient in the peak curve is drawn, and an intersection with the baseline is determined. In the case of a curve at the time of cooling, the intersection with the initial rise is $M_s$ point (martensitic transformation starting temperature), and the intersection on the lower temperature side is $M_f$ point (martensitic transformation finish temperature). In the case of a curve at the time of heating, $A_s$ point (reverse martensitic transformation starting temperature) and $A_f$ point (reverse martensitic transformation finish temperature) are determined, in the same manner.

The transverse axis represents temperature (° C.), the vertical axis represents the amount of heat transfer (arbitrary unit), and the respective transformation temperatures can be checked at a point of variation in the gradient of the chart determined by the technique described above.

In the present invention, the temperature change after performing 10 cycles of temperature rising and temperature lowering by DSC is checked, and this is defined as the thermal cycle characteristics.

The measurement method by DSC and the measurement conditions will be described below.

A specimen having a size of 3.8 mm×3.8 mm×1 mm is cut out from a sample material, and a processed layer at the surface is removed by an etching treatment, with using a mixed solution of $HF:HNO_3:H_2O=1:4:5$ (vol %). Measurement is performed using differential scanning calorimeters DSC-60 and DSC-60 Plus, manufactured by Shimadzu Corp. The speed of temperature rising or lowering is set at 10° C./min, $\alpha$-$Al_2O_3$ is used as a reference sample, and 10 cycles are performed in a temperature range of from −130° C. to 250° C.

In the present invention, the lowering in the transformation temperature after 10 cycles in the above-described thermal cycle test is 1.0° C. or less.

<<Method of Producing Ti—Ni-Based Alloy Material>>

In order to perform the control of the torsion angle θ, studies are conducted, on the respective crystal structures and lattice constants of the parent phase and the martensitic phase. As a result, when the above-described predetermined alloy composition defined in the present invention is melted by, for example, vacuum arc melting, vacuum dielectric melting, plasma melting, or electron beam melting, then the thus-molten product is cast at a particular cooling speed, and then the thus-cast product is subjected to various hot working and cold working, or to hot working or cold working, followed by annealing or heat treatment, a Ti—Ni-based alloy can be produced, which is obtained by imparting a shape memory effect or superelastic characteristics to the above-described alloy. The alloy system of the present invention can be subjected to general working and heat treatment as described above; however, alternatively, the alloy system can also exhibit a shape memory effect or superelastic characteristics only when the alloy system is subjected to melting and casting at a particular cooling speed, followed by a homogenization treatment. Thus, it is found that the alloy system can be formed into useful articles having high thermal cycle characteristics, while maintaining sufficient forming characteristics, as compared to conventional Ti—Ni-based alloys.

According to the present invention, the first production method, including: a step of melting a Ti—Ni-based alloy, and casting the thus-molten alloy at a cooling speed of 10° C./second or higher; and a step of homogenization treatment.

That is, according to the present invention, the second production method, including: two production steps of: Step A that requires predetermined working, such as hot working and cold working; and Step B that requires only a step of melting and casting at a cooling speed of 10° C./second or higher and a step of annealing (homogenization treatment).

Particularly, according to the present invention, it is preferable that the following Steps (a) to (d) are included:

Step (a) a step of: melting the Ti—Ni-based alloy of the present invention, and casting the thus-molten product at a cooling speed of 10° C./second or higher; Step (b) a step of performing hot working at a temperature higher than the recrystallization temperature;

Step (c) a step of: performing intermediate annealing, and cold working at a cumulative working ratio of 15% or higher; and Step (d) a step of: forming the resultant alloy into a desired shape by imparting a shape memory effect to the product, and imparting a shape memory effect at a temperature at which, when the alloy is reheated to a temperature higher than or equal to the reverse martensitic transformation finish temperature ($A_f$ temperature), a desired shape memory effect is obtained.

Herein, it is found in the present invention that for the control of the torsion angle or the number of martensitic phases, the control of the production conditions related to (a) is particularly important.

The material of the present invention is an alloy system that has come to be developed, by considering the subtle consistency of the crystal structure important. Thus, it is found that control of the size of the inclusion is important, and for this control, it is necessary to further rise of the cooling speed at the time of pouring the molten metal into a mold to solidify, in addition to the conventional working conditions.

That is, it is found that essentially, the control of the cooling speed strongly affects the torsion angle of Interface I, which is a junction plane between variants, or the crystal structure of the martensitic phase, and it is important for the control of the working steps thereafter.

<Definition of Cooling Speed and Method of Control Thereof>

Herein, a method of measuring the cooling speed according to the present invention will be explained. In the present invention, DAS (dendrite arm spacing) is used as a substitute indicator for the cooling speed. The thermal conductivity of the present alloy is about 12.1 W/(m·K) at room temperature, and thus the thermal conductivity is poor. Thus, measurement is performed at a site near the casting surface where cooling occurs relatively strongly, and the cooling speed is determined from the value of the DAS by calculating by the calculation formula. Regarding the calculation formula, the formula disclosed in article: International Journal of Cast Metals Research, 2016, Vol. 29, No. 5, p. 303-316, is used. Calculation of the cooling speed is enabled by measurement of the DAS by the calculation formula described above. Meanwhile, the control of the cooling speed according to the present invention depends on the material of the mold or the temperature of the cooling water. The cooling speed needed for the present invention is 10° C./second or higher, preferably 15° C./second or higher, and more preferably 20° C./second or higher. Furthermore, the thermal conductivity of the mold required for satisfying the cooling speed described above is a thermal conductivity of 12 W/(m·K) or higher.

In the following description, the treatment temperature and treatment time (annealing time) for the respective heat treatments, and the working ratio (cumulative working ratio) for hot working or cold working, are respectively shown by taking the values obtained by using Example 2 that will be described below, as representative values, and the present invention is not intended to be limited to these.

(Step A)

Melting and casting are performed such that the above-mentioned cooling speed satisfies the condition, then hot working, such as hot rolling or hot forging, is performed at a temperature of 950° C. or lower at a working ratio of 15% or higher, and then intermediate annealing is performed at a temperature of 850° C. or lower for 30 minutes or longer, and then cold working, such as cold rolling or cold drawing, is performed at a working ratio of 15% or higher. Herein, intermediate annealing and cold working may be carried out once each in this order until working can be achieved at a cumulative working ratio of 15% or higher, or may be carried out repeatedly two or more times in this order. Then, a memory heat treatment may be carried out at 700° C. or lower; however, depending on the intended transformation temperature, it is also acceptable not to perform the memory heat treatment step.

(Preferred Conditions for Step A)

Preferably, the following production condition may be mentioned.

Hot working, such as hot rolling or hot forging, is such that if the temperature is too high, the surface quality is deteriorated due to the influence of an oxide coating. Thus, it is preferred to carry out the hot working at a temperature of 900° C. or lower at a working ratio of 30% or higher. Furthermore, regarding the intermediate annealing, for a similar reason, when heat treatment is performed for an excessively long time at a high temperature, the influence of the oxide coating comes out; however, on the other hand, when the annealing time is too short, annealing is insufficiently achieved, and the resultant alloy may not be subjected to working. The conditions for the intermediate annealing are preferably 800° C. or lower and 30 minutes or longer. Furthermore, cold working is preferably carried out such that intermediate annealing and cold working are repeated five or more times in this order so as to obtain a cumulative working ratio of 20% or higher. The memory heat treatment may vary depending on the temperature range in which the present alloy material is used; however, a temperature of 700° C. or lower is preferred.

(Step B)

Melting and casting are performed such that the above-described cooling speed satisfies the conditions, and then a homogenization treatment is carried out at a temperature of 800° C. or higher for one hour or longer.

(Preferred Conditions for Step B)

A homogenization treatment is a step intended for homogenization of a crystallization product and a precipitation product obtained by solidification, and adjustment of the size and density of the crystallization product and the precipitation product. Thus, it is easier to obtain the intended effect when the temperature is higher and the time is longer. Since a state in which a liquid and a solid co-exist is attained if the temperature is too high, the resultant alloy may partially melt. It is preferable to perform the homogenization treatment at a temperature of from 900° C. to 1,100° C. for 2 hours or longer.

<<Use (Applications) of Ti—Ni-Based Alloy>>

The Ti—Ni-based alloy of the present invention has excellent thermal cycle characteristics, and it can be used as a shape memory alloy for a variety of use applications where a shape memory effect is required.

For example, it is expected for the Ti—Ni-based alloy to be applicable into application to an electrically conductive actuator, a temperature sensor, a connector, and the like, as various wire rods.

Furthermore, since the alloy has superelastic characteristics, the alloy is expected as a superelastic alloy.

EXAMPLES

The present invention will be described in more detail based on examples given below, but the invention is not meant to be limited by these.

Examples 1 to 14 and Comparative Examples 1 to 20

Sample materials were produced by the following step(s) under the following conditions.

As the material for a Ti—Ni-based alloy that gives the compositions indicated in the following Table 1, Ti and Ni at a purity of 99.99%, Cu at a purity of 99.97%, and Hf, Zr, Ta, and Nb at a purity of 98% were subjected to arc melting in an atmosphere of Ar-1% $H_2$, and thus the respective ingot was produced.

In Table 1, the symbol "-" indicates that artificial addition was not performed. Furthermore, in Table 1, unavoidable impurities were included at a proportion of 0.1 atom % or less.

TABLE 1

|   | Ni | Hf | Cu | Zr | Ta | Nb | Balance |
|   |    |    | (at. %) |    |    |    |         |
| A | 35.0 | 5.0 | 15.0 | — | — | — | Ti + unavoidable impurities |
| B | 30.0 | 3.0 | 20.0 | — | — | — | Ti + unavoidable impurities |
| C | 30.0 | 5.0 | 20.0 | — | — | — | Ti + unavoidable impurities |
| D | 30.0 | 7.0 | 20.0 | — | — | — | Ti + unavoidable impurities |
| E | 30.0 | 10.0 | 20.0 | — | — | — | Ti + unavoidable impurities |
| F | 25.0 | 5.0 | 25.0 | — | — | — | Ti + unavoidable impurities |
| G | 30.0 | 0.0 | 20.0 | — | — | — | Ti + unavoidable impurities |

TABLE 1-continued

|   | Ni | Hf | Cu | Zr | Ta | Nb | Balance |
|---|---|---|---|---|---|---|---|
|   | (at. %) | | | | | | |
| a | 50.0 | — | — | — | — | — | Ti + unavoidable impurities |
| b | 50.0 | 15.0 | — | — | — | — | Ti + unavoidable impurities |
| c | 50.0 | 10.0 | — | — | — | — | Ti + unavoidable impurities |
| d | 45.0 | — | 5.0 | — | — | — | Ti + unavoidable impurities |
| e | 40.0 | 10.0 | 10.0 | — | — | — | Ti + unavoidable impurities |
| f | 35.0 | 10.0 | 15.0 | — | — | — | Ti + unavoidable impurities |
| g | 35.0 | 15.0 | 15.0 | — | — | — | Ti + unavoidable impurities |
| h | 49.5 | — | — | 15.0 | — | — | Ti + unavoidable impurities |
| i | 50.0 | — | — | — | 5.0 | — | Ti + unavoidable impurities |
| j | 44.7 | — | — | — | — | 9.0 | Ti + unavoidable impurities |

The production step was carried out under the production conditions as indicated in the following Table 2.

In the case of Step B, the above-described ingots were sealed in transparent quartz tubes, and the ingots were subjected to a homogenization treatment at a temperature of 900° C. for a time of 3 hours and were quenched. Then, the ingots were shaped into various specimen sizes for experiment by electric discharge machining.

In the case of Step A, each of the ingots was heated for 2 hours at 900° C., then subjected to hot forging, then subjected to hot rolling at a temperature of 800° C. to 900° C., and shaped to a size capable of cold working. Then, the ingot was subjected to intermediate annealing at 750° C. for 30 minutes or longer, and then was subjected to cold working at a cumulative working ratio of about 20%. Intermediate annealing and cold working were carried out repeatedly for five or more times under the above-described conditions. Lastly, a memory heat treatment was performed in a temperature range of 550° C. to 650° C., and adjustment was so as to enable an evaluation of the thermal cycle characteristics in a temperature range of −130° C. to 250° C.

In Table 2, the symbol "-" indicates that the step was not performed.

TABLE 2

|   |   | Step A | Step B |
|---|---|---|---|
| Melting and casting | | Melting and casting by vacuum arc melting, vacuum dielectric melting, plasma melting, electron beam melting, or the like, provided that cooling speed at the time of casting is 10° C./second or higher | |
| Homogenization treatment | Temperature | — | 800° C. or higher |
|   | Time | — | About one hour |
| Hot working | Working temperature | 950° C. or lower | — |
|   | Total working ratio | 15% or more | — |
| Cold working | Intermediate annealing temperature | 850° C. or lower | — |
|   | Intermediate annealing time | 30 minutes or longer | — |
|   | Total working ratio | 15% or more | — |
| Memory heat treatment (annealing) | Temperature | 700° C. or lower | — |

<Evaluation of Thermal Cycle Characteristics>

For the various alloy materials obtained as described above, the thermal cycle characteristics were evaluated as follows by DSC.

From a sample material of each alloy material, a specimen having a size of 3.8 mm×3.8 mm×1 mm was cut out, and the processed layer at the surface was removed by an etching treatment, with using a mixed solution of HF:HNO$_3$:H$_2$O=1: 4:5 (vol %). Measurement was carried out, with using differential scanning calorimeters DSC-60 and DSC-60 Plus, manufactured by Shimadzu Corp. The speed of temperature rising or lowering was set at 10° C./min, α-Al$_2$O$_3$ was used as a reference sample, and 10 cycles were carried out in a temperature range of from −130° C. to 250° C.

Figure 6:
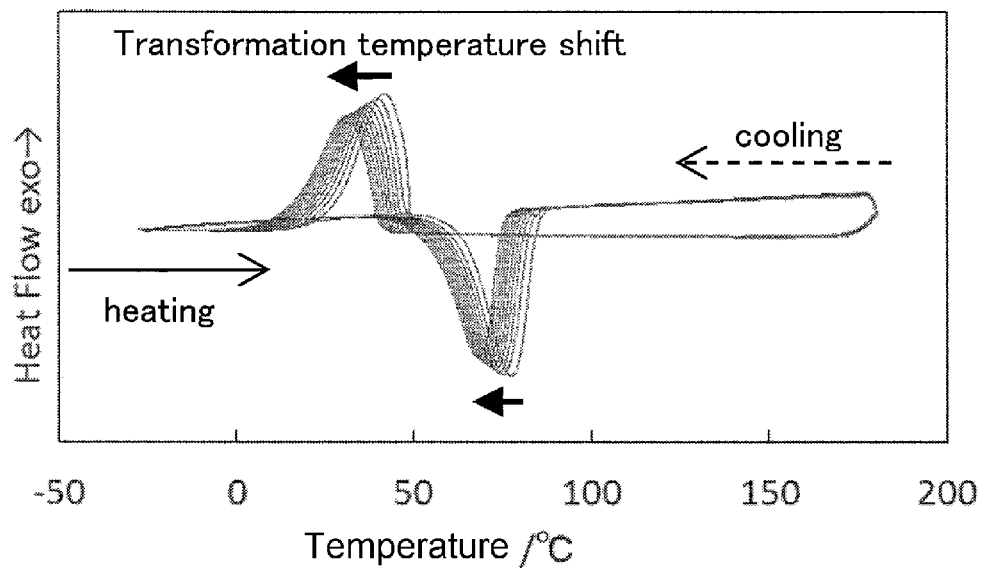
FIG. 6 is a chart showing the results of DSC for evaluating the thermal cycle characteristics in Comparative Example 5.

Herein, as a representative, FIGS. 5 and 6 showed DSC charts of the test results for a thermal cycle characteristics of the alloy materials of Example 2 and Comparative Example 5. FIG. 5 shows the results of the alloy material of Example 2, and FIG. 6 shows the results of the alloy material of Comparative Example 5.

In a thermal cycle test of performing 10 cycles, the transformation temperature shift of $M_s$ thus obtained is summarized in the following Table 3.

Furthermore, the forms (the number of phases) of the martensitic phase (M phase) and the torsion angle θ of Interface I that is a junction plane between HPV's of the martensitic phase, are shown in the following Table 3, each of which is obtained from an analysis of the crystal structure of each of the alloy materials such as described above.

The torsion angle θ of the Interface I that is determined in the present invention is preferably 1.00° or less, and more preferably 0.70° or less.

Furthermore, the number of form phases of the M phase that is determined in the present invention may be one phase; however, the number of phases is more preferably two or more phases.

A sample having an absolute value of the transformation temperature shift of $M_s$ of 1.0° C. or less is considered to have good thermal cycle characteristics, and is rated as "o"; a sample having an absolute value of 0.6° C. or less is considered to have excellent characteristics, and is rated as "⊚"; a sample having an absolute value of more than 1.0° C. is considered to have poor characteristics, and is rated as "×"; and a sample that did not exhibit a shape memory effect is considered to be "Unable (unable to exhibit any characteristics)". These results are also shown in the following Table 3. The thermal cycle characteristics that are required in the present invention are such that the absolute value of the transformation temperature shift of $M_s$ is preferably 1.0° C. or less, and more preferably 0.6° C. or less.

Meanwhile, in Table 3, the symbol "-" indicates that the sample was unable to exhibit any characteristics.

TABLE 3

| Alloy No. | Form of M phase (phases) | Torsion angle (°) | Transformation temp. shift (° C.) | Manufacturing step | Rating of transformation temp. shift |
|---|---|---|---|---|---|
| Ex 1 | A | 2 | 0.34 | −0.5 | Step A | ⊚ |
| Ex 2 | B | 2 | 0.03 | −0.2 | Step A | ⊚ |
| Ex 3 | C | 2 | 0.02 | 0.0 | Step A | ⊚ |
| Ex 4 | D | 2 | 0.65 | −0.4 | Step A | ⊚ |
| Ex 5 | E | 2 | 0.90 | −1.0 | Step A | ○ |
| Ex 6 | F | 1 | 0.10 | 1.0 | Step A | ○ |
| Ex 7 | G | 2 | 0.25 | 0.0 | Step A | ⊚ |
| Ex 8 | A | 2 | 0.34 | −0.4 | Step B | ⊚ |
| Ex 9 | B | 2 | 0.03 | −0.2 | Step B | ⊚ |
| Ex 10 | C | 2 | 0.02 | 0.0 | Step B | ⊚ |
| Ex 11 | D | 2 | 0.65 | −0.3 | Step B | ⊚ |
| Ex 12 | E | 2 | 0.90 | −0.9 | Step B | ○ |
| Ex 13 | F | 1 | 0.10 | 1.0 | Step B | ○ |
| Ex 14 | G | 2 | 0.25 | 0.0 | Step B | ⊚ |
| CEx 1 | a | 1 | 2.69 | −19.0 | Step A | X |
| CEx 2 | b | 1 | 6.27 | −16.0 | Step A | X |
| CEx 3 | c | 1 | 4.47 | −19.0 | Step A | X |
| CEx 4 | d | 1 | 2.22 | −8.0 | Step A | X |
| CEx 5 | e | 1 | 4.24 | −9.0 | Step A | X |
| CEx 6 | f | 1 | 4.60 | −7.0 | Step A | X |
| CEx 7 | g | 1 | 4.80 | −4.0 | Step A | X |
| CEx 8 | h | 1 | 6.80 | −18.0 | Step A | X |
| CEx 9 | i | 1 | 4.84 | −15.0 | Step A | X |
| CEx 10 | j | 1 | 4.99 | −20.0 | Step A | X |
| CEx 11 | a | 1 | 2.69 | — | Step B | Unable |
| CEx 12 | b | 1 | 6.27 | — | Step B | Unable |
| CEx 13 | c | 1 | 4.47 | — | Step B | Unable |
| CEx 14 | d | 1 | 2.22 | — | Step B | Unable |
| CEx 15 | e | 1 | 4.24 | — | Step B | Unable |
| CEx 16 | f | 1 | 4.60 | — | Step B | Unable |
| CEx 17 | g | 1 | 4.80 | — | Step B | Unable |
| CEx 18 | h | 1 | 6.80 | — | Step B | Unable |
| CEx 19 | i | 1 | 4.84 | — | Step B | Unable |
| CEx 20 | j | 1 | 4.99 | — | Step B | Unable |

Note:
Ex means Example according to this invention.

Note:
CEx means Comparative Example.
"Unable" means to be "Unable to exhibit any characteristics"

As is clear from Table 3 described above, all of the Ti—Ni-based alloy materials (Examples 1 to 14) of the present invention are such that the torsion angle θ is less than 1.00°.

Furthermore, regarding all of the Ti—Ni-based alloy materials (Examples 1 to 14) of the present invention, the absolute value of the transformation temperature shift of $M_s$ was 0.0° C. to 1.0° C., regardless of the production step, that is, irrespective of Step A or B.

From these results, it can be seen that the transformation temperature shift after 10 cycles is very small, and the thermal cycle characteristics are excellent.

Herein, the thermal cycle characteristics are dependent on the size of the torsion angle θ described above, and it is considered that in an alloy material having a small torsion angle θ, satisfactory thermal cycle characteristics were obtained.

In contrast, with regard to the Ti—Ni-based alloy materials (Comparative Examples 1 to 20) for which the torsion angle θ is 1.00° or larger, regarding the alloy materials produced in Step A (Comparative Examples 1 to 10), the absolute value of the transformation temperature shift of $M_s$ was more than 4.0° C. On the other hand, the alloy materials produced in Step B (Comparative Examples 11 to 20) did not become shape memory alloys after all and did not exhibit any shape memory effect.

Herein, for example, Comparative Example 5 produced in Step A, is an alloy that is conventionally known as a high-temperature shape memory alloy and exhibits a satisfactory shape memory effect; however, when thermal cycles are carried out, deterioration of the characteristics is severe. As shown in FIG. 6, the transformation temperature shift after 10 cycles was −9.0° C., and the alloy material exhibited poor thermal cycle characteristics as compared to the materials of the present invention.

As such, the Ti—Ni-based alloy materials obtained in Examples 1 to 14 satisfy the conditions that the torsion angle as defined by the present invention is 1.00° or less, and thus have excellent thermal cycle characteristics.

On the other hand, the Ti—Ni-based alloy materials obtained in Comparative Examples 1 to 20 gave results of poor thermal cycle characteristics. Furthermore, since even the exhibition of a shape memory effect is made impossible with Step B, the thermal cycle characteristics do not raise an issue.

Furthermore, it is clear that the alloy materials of the present invention can exhibit excellent thermal cycle characteristics even if there are differences in the production steps, and are more advantageous compared to conventional alloy systems.

According to the present invention, it is considered that since the alloy materials are high-level alloy materials having the torsion angle θ precisely controlled, a special effect is exhibited.

Having described our invention as related to the present embodiments, it is our intention that the invention not be limited by any of the details of the description, unless otherwise specified, but rather be construed broadly within its spirit and scope as set out in the accompanying claims.

This application claims priority on Patent Application No. 2017-197222 filed in Japan on Oct. 10, 2017, which is entirely herein incorporated by reference.

The invention claimed is:

1. A Ti—Ni-based alloy, which has a torsion angle for Interface I, which is a junction plane between habit plane variants of a martensitic phase, of less than 1.00°,
   wherein the Ti—Ni-based alloy comprises 25.0 to 35.0 atom % of Ni, 0.0 to 10.0 atom % of Hf, and 15.0 to 25.0 atom % of Cu, with a balance being Ti and unavoidable impurities, in which a content of each unavoidable impurity is 0.1 atom % or less, and wherein the Ti—Ni-based alloy has a recrystallized structure, and is a Ti—Ni-based shape memory alloy or a Ti—Ni-based superelastic alloy,
   wherein a crystal structure of the martensitic phase is a single phase of B19' or B19, or is a mixed phase in which the B19' phase or the B19 phase co-exists simultaneously with another phase, and
   wherein the torsion angle is determined by X-ray diffraction measurement under conditions of CuKα as an X-ray source, a tube voltage of 45 kV, a tube current of 40 mA, and a measurement range of 15° to 120°.

2. The Ti—Ni-based alloy according to claim 1, in which a transformation temperature after 10 cycles in a thermal cycle test is lowered by 1.0° C. or less, and
   the thermal cycle test is performed by Differential Scanning Calorimeter under conditions of a temperature rising or lowering speed of 10° C./min, α-Al$_2$O$_3$ as a reference sample, and a temperature range of −130° C. to 250° C.

3. A wire, which is composed of the Ti—Ni-based alloy according to claim 1.

4. An electrically conductive actuator, in which the wire according to claim 3 is applied.

5. A temperature sensor, in which the wire according to claim 3 is applied.

6. A method of producing the Ti—Ni-based alloy according to claim 1, with the method comprising: a step of melting the Ti—Ni-based alloy having an alloy composition as defined in claim 1, and casting the thus-molten alloy at a cooling speed of 10° C./second or higher; and a step of homogenization treatment,
   wherein:
   the melting is vacuum arc melting, vacuum dielectric melting, plasma melting, or electron beam melting,
   the casting is done using a mold with a thermal conductivity of 12 W/(m·K) or higher, and
   the homogenization treatment is carried out at a temperature of 800° C. or higher for one hour or longer.

7. A method of producing the Ti—Ni-based alloy according to claim 1, with the method comprising the following Steps (a) to (d):
   Step (a): a step of melting the Ti—Ni-based alloy having an alloy composition as defined in claim 1, and casting the thus-molten alloy at a cooling speed of 10° C./second or higher;
   Step (b): a step of hot working the resultant alloy at a temperature higher than a recrystallization temperature;
   Step (c): a step of performing intermediate annealing, and cold working at a cumulative working ratio of 15% or higher; and
   Step (d): a step of forming a desired shape, by imparting a shape memory effect, and imparting a shape memory effect at a temperature at which a desired shape memory effect is obtained when the resultant alloy is re-heated to a temperature higher than or equal to a reverse martensitic transformation finish temperature (A$_f$ temperature),
   wherein:
   the melting of Step (a) is vacuum arc melting, vacuum dielectric melting, plasma melting, or electron beam melting, and
   the casting of Step (a) is done using a mold with a thermal conductivity of 12 W/(m·K) or higher.

8. A Ti—Ni-based alloy, which has a torsion angle for Interface I, which is a junction plane between habit plane variants of a martensitic phase, of less than 1.00°,
   wherein the Ti—Ni-based alloy comprises 25.0 to 35.0 atom % of Ni, 3.0 to 10.0 atom % of Hf, and 15.0 to 25.0 atom % of Cu, with a balance being Ti and unavoidable impurities, in which a content of each unavoidable impurity is 0.1 atom % or less, and wherein the Ti—Ni-based alloy has a recrystallized structure, and is a Ti—Ni-based shape memory alloy or a Ti—Ni-based superelastic alloy,
   wherein a crystal structure of the martensitic phase is a mixed phase in which a B19' phase co-exists simultaneously with another phase, and
   wherein the torsion angle is determined by X-ray diffraction measurement under conditions of CuKα as an X-ray source, a tube voltage of 45 kV, a tube current of 40 mA, and a measurement range of 15° to 120°.

9. The Ti—Ni-based alloy according to claim 1, in which the crystal structure of the martensitic phase is a mixed phase having the B19' phase and a Cm structure, or a mixed phase having the B19' phase and the B19 phase.

* * * * *